United States Patent [19]

Stockley et al.

[11] Patent Number: 5,400,131
[45] Date of Patent: Mar. 21, 1995

[54] PHOTOELASTIC STRESS ANALYSIS

[75] Inventors: Barrie C. Stockley, Shipston on Stour; Clive H. Buckberry, Leamington Spa, both of United Kingdom

[73] Assignee: Rover Group Limited, England

[21] Appl. No.: 25,882

[22] Filed: Mar. 3, 1993

[30] Foreign Application Priority Data

Mar. 28, 1992 [GB] United Kingdom ................ 9206859

[51] Int. Cl.$^6$ ............................................. G01B 11/18
[52] U.S. Cl. ........................................ 356/33; 356/365
[58] Field of Search ................ 356/33, 35, 32, 364, 356/365, 366, 367

[56] References Cited

U.S. PATENT DOCUMENTS

| | | | |
|---|---|---|---|
| 4,171,908 | 10/1979 | Robert et al. | 356/33 |
| 4,179,217 | 12/1979 | Robert et al. | 356/33 |
| 4,408,160 | 10/1983 | King et al. | 324/209 |
| 4,749,854 | 6/1988 | Martens | 250/225 |
| 4,794,550 | 12/1988 | Greivenkamp, Jr. | 356/374 |
| 4,914,487 | 4/1990 | Croizer | 356/35 |
| 4,973,163 | 11/1990 | Sakai | 356/367 |
| 5,020,904 | 6/1991 | McMahan, Jr. | 356/35.5 |

FOREIGN PATENT DOCUMENTS

3631959 3/1987 Germany.

OTHER PUBLICATIONS

Redner, Experimental Mechanics, vol. 14, No. 12, 1974 pp. 486-491.
Redner, Experimental Mechanics, vol. 15, No. 6, 1976 pp. 221-225.
Voloshin, Experimental Mechanics, Sep. 1989, pp. 252-257.
Fessler, Journal & Strain Analysis, vol. 22, No. 1, 1987, pp. 25-35.
Muller, Experimental Mechanics, Jul. 1979, pp. 245-251.
Segughi, Experimental Mechanics, Oct. 1979, pp. 362-370.
Voloshin, Experimental Mechanics, Sep. 1983, pp. 304-313.
Bruning, Applied Optics, vol. 13, 1974, p. 693.
Schwider, Applied Optics, vol. 22, 1983, p. 3421.
Takeda, Journal Optical Society of American, vol. 72, 1982, p. 156.
Brown, SPIE Proceedings, vol. 746, 1987 pp. 79-84.
Brown, SPIE Proceedings, vol. 863, 1987 pp. 213-222.
Hecker, Experimental Stress Analysis, ISBN 90-24-7-3364-4, pp. 535-542.
Patterson, Strain, May 1991, pp. 49-53.

*Primary Examiner*—Robert P. Limanek
*Assistant Examiner*—David B. Hardy
*Attorney, Agent, or Firm*—Davis, Bujold & Streck

[57] ABSTRACT

Polarized light from a polarizer 12 is passed through a stressed birefringent object 14 and an analyser 16 to produce a fringe pattern representative of the stress in the object 14. The fringe pattern is observed with a CCD camera 18 and intensity information of the pattern is input to a computer 22. The process is repeated for at least two wavelengths of light and the information for the different wavelengths is combined to form a stress map of the object 14 for display on a VDU 24.

15 Claims, 3 Drawing Sheets

PHOTOELASTIC STRESS ANALYSIS

The present invention relates to photoelastic stress analysis, which has for many years been the only tool available to the experimental stress analyst capable of providing full-field stress analysis away from the external surface. The technique has become extremely well refined permitting structures of great complexity to be modelled. As a result it has become very useful for verification of finite element models where contact and interference stresses are present.

Techniques such as SPATE (Stress Pattern Analysis by Thermal Emission) and Holography have received much attention lately but suffer inherently from the limitations that they can only examine external surfaces, and do not measure the variable of greatest interest, shear stress, which is generally considered in most engineering stress models as being the most damaging. SPATE measures the sum of the principle stresses and Holography either in-plane or out-of-plane displacement depending on the optical configuration. Shear stress is equal to the difference in principle stresses.

However, because of the great skill required in interpreting the photoelastic data and the time taken, the two techniques mentioned above have received greater popularity despite their own particular drawbacks. Photoelastic stress analysis is a technique which allows a complete stress analysis to be carried out on scale models of components and structures.

The model, made of a suitable material such as ARALDITE (an epoxy resin material used for photoelastic stress analysis which is birefringent having refractive indexes which vary with the stress applied to them, can be stressed either by being held under a load, or by having the stress "frozen" into it by applying a load to it and oven heating it so that the stress remains when the load is removed. Under strain the ARALDITE becomes birefringent, and polarised light produced with a light source and a polariser and passed through the model is split into two components; one in the direction of the algebraic maximum principal stress, $\sigma 1$, and one in the direction of the algebraic minimum principal stress, $\sigma 2$. The refractive index of the material is proportional to the level of stress, so each component will pass through the model with a velocity which is dependant on the corresponding principal stress. Therefore, if $\sigma 1$ is greater than $\sigma 2$, there will be a phase lag between the emerging component waves, which can be used to calculate the magnitude of $(\sigma 1 - \sigma 2)$, and hence the magnitude of the shear stress, $\tau$.

The model can then be viewed through an analyzer which will allow through only one component, for example the horizontal component, of each wave, effectively producing two components with similar amplitude but different phase. Interference will occur, giving rise to a pattern of fringes.

These fringes relate to the magnitude of the shear stress, and are known as isochromatics.

A second optical effect occurs at points in the model where one of the principal stresses is parallel with the axis of the polariser. At these points the plane-polarised light will pass through the model unchanged, and, if the analyzer axis is perpendicular to the polarizer axis, will be vibrating perpendicularly to the axis of the analyzer. Consequently no light can pass through, and a dark fringe is produced, corresponding to a locus of points with constant principal stress directions. This type of fringe is known as an isoclinic fringe.

The isochromatic and isoclinic fringes are superimposed on one another, and need to be isolated in order to measure accurately the magnitude and direction of stress in the model.

There have been many attempts to provide automatic analysis of photoelastic fringes either at a point or full-field, with little or no operator interaction. Prior to the development of cheap CCD cameras and PC computers with image processing boards, several pointwise measuring systems were developed during the seventies (Redner, Experimental Mechanics Vol 14, No. 12, 1974 pp 486–491 and Vol 15, No. 6, 1976 pp 221–225). In these systems photoelectric sensors were utilised to measure the phase difference at a point. In the case of the isoclinic angle, the phase difference was derived from that between a point measured in a continuously rotating crossed polariscope and the driving motor reference signal. The isochromatic fringe order and fraction was found by measuring the difference in phase, at a point in a continuously rotating circular polariscope, between two wavelength components from a white light source. The dynamic range and sensitivity of this approach could be altered by changing the difference in the two wavelengths used. Voloshin, (Experimental Mechanics, September 1989, pp 252–257) has taken this spectral concept further, using a 1-Dimensional array so that the spectral content of a point may be analysed. More recently Fessler (Journal & Strain Analysis, Vol 22 No. 1 1987 pp 25–35) developed a scanning pointwise system, but human interaction was required to assign the whole order fringe value and to place the isoclinic angles in the correct quadrant. The end of the seventies saw the early use of full-field systems using cameras and computers. Almost simultaneously Muller (Experimental Mechanics July 1979 pp 245–251) and Seguchi (Experimental Mechanics, October 1979 pp 362–370) published results of their work. Both authors used combinations of binary thresholding erosion, dilation and histogram equalisation to identify the fringe centres. Fractional values were then found by extrapolation and interpolation. Again like the pointwise system of Fessler the operator had to assign the fringe order.

Voloshin (Experimental Mechanics, September 1983 pp 304–313) developed a completely new approach, based upon the new ideas at the time of full-field phase measurement Bruning (Applied Optics, Vol 13, 1974, p 693), Schwider (Applied Optics, Vol 22, 1983 p 3421) and Takeda (J. Opt. Soc. Am. Vol 72, 1982, p 156). However in order to make his system work the isochromatic fringe order had to be maintained to less than half-a-fringe. Brown (SPIE Proc. 746 1987 pp 79–84, SPIE Proc 863 1987, pp 213–222) took this step further when he showed that the isoclinic angle could be determined using phase-stepping techniques in such a half-fringe field as well as the isophachic valve. Brown's system provided the first fully automated full-field system that had no ambiguity, provided absolute fringe "order" and fractional values with no points of ambiguity in the fringe field. Hecker (Experimental Stress Analysis, ISBN 90-247-3364-4, 1986 pp 535–542) took the phase-stepping approach one step further, by using a circular-plane polariscope. In this arrangement the images are a combination of isochromatic and isoclinic retardation, however, by suitable manipulation of the equations the isochromatic term can be extracted. A plane polariscope is then used to extract the isoclinic term. This approach suffers from points of ambiguity in the field and like the work of Brown uses more than one polariscope i.e. circular and plane. Furthermore, the isochromatic magnitude needs to be made absolute from a point measurement by the operator. Patterson (Strain, May 1991, pp 49–53), simplified the Hecker approach by using a circular plane polariscope to extract both isochromatic and isoclinic phase retardation values, but still suffered from the same limitations as Hecker.

The present invention aims to provide a method of analysing photoelastic fringes automatically, for example using a CCD camera and an image processing board while avoiding the drawbacks outlined above with the prior art.

Accordingly the present invention provides a method for measuring stress in an object of birefringent material comprising the steps of:

passing polarized light of first and second wavelengths through the object and an analyzer, for each wavelength measuring and recording the intensity of light emitted from the analyzer for a plurality of positions, and combining the recorded intensity information for the first and second wavelengths to form a stress map indicating a component of the stress in the object as a function of position.

By combining the intensity information found at one wavelength with that found at a different wavelength it is possible to determine the absolute stress magnitude and direction at each point on the stress map.

Preferably, information from the first and second fringe maps is processed to form first and second phase maps, which are then combined to form the stress map.

Phase data is independant of intensity, and therefore different wavelengths can be used without having to compensate for the different energies from the light source, for the different camera sensitivities, and for the different transmission efficiencies of the optics. In addition, the phase map has more sharply-defined turning points than an intensity map would have.

The present invention also provides an apparatus for measuring stress in an object of birefringent material comprising a source of polarized light; an analyzer for transmitting a component of the light, emitting from the object, which is parallel to an analyzer direction; light detecting means for measuring the intensity of light emitted from the analyzer as a function of position; a memory for storing intensity information in the form of a fringe map; and processing means for combining information from fringe maps for two wavelengths of light to form a stress map indicating a component of the stress in the object as a function of position.

Preferred embodiments of the present invention will now be described by way of example only with reference to the accompanying drawings in which:-

Figure 1:
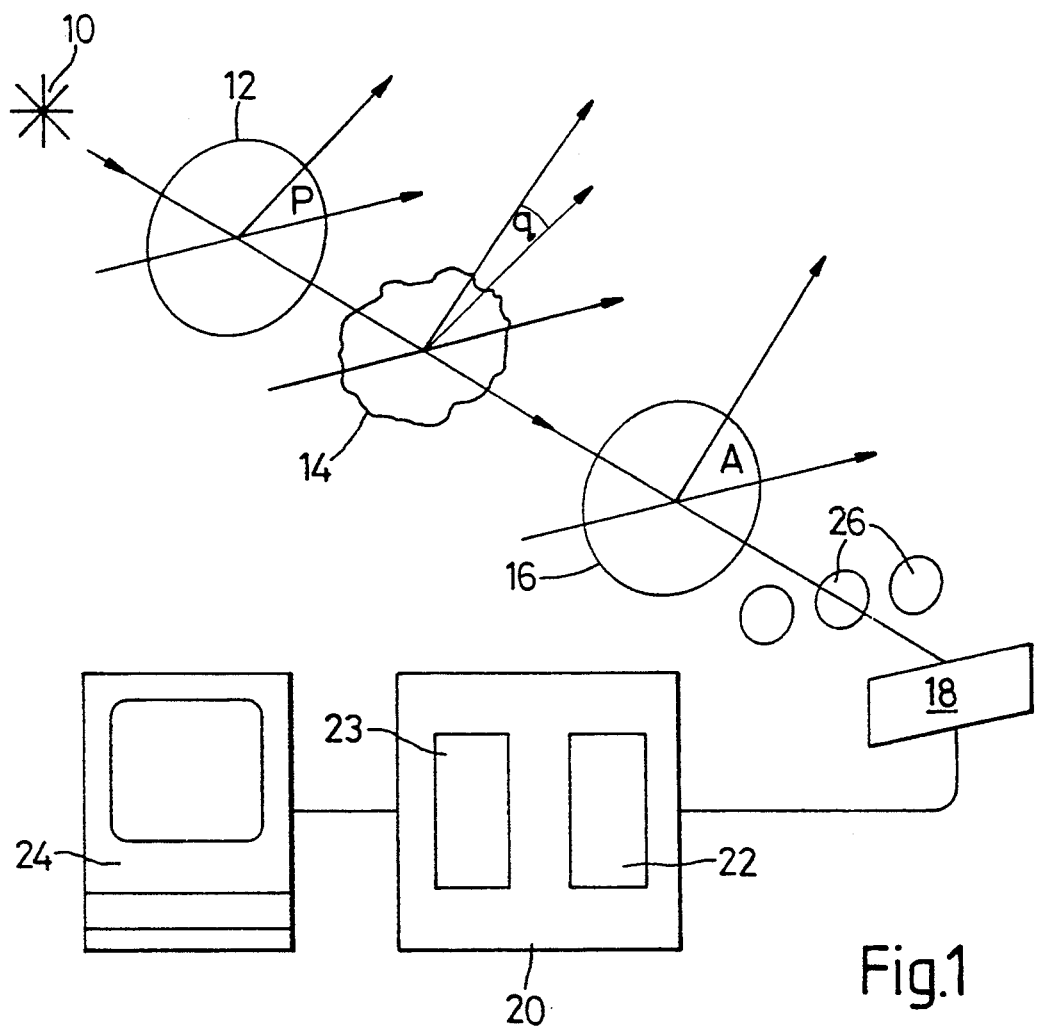
FIG. 1 is a diagrammatic representation of the apparatus according to the present invention.

Referring to FIG. 1, a source of polarized light comprises a light source 10 and a polarizer 12 have a polarizing axis at an angle P to the horizontal. An object of birefringent material 14 is placed in front of the polarizer 12, and an analyzer 16 having an analyzing axis at an angle A to the horizontal is placed in the path of light emitting from the object 14. A CCD camera 18 is arranged to detect the intensity of light coming from the analyzer 16 and is coupled to a computer 20 having a memory 22 for storing information from the CCD camera 18 and a processing unit 23 for processing the information. A VDU 24 is connected to the computer for providing a visual display of information in the computer.

Filters 26 can be placed between the analyzer 16 and the CCD camera so that the intensities measured are of substantially monochromatic light.

To measure the magnitude of shear stress in the object we need to consider the isochromatic fringes in detail.

Measurements are taken for two arrangements of the analyzer and polarizer. When they are parallel the measurements are referred to as "bright field" measurements and when they are perpendicular the measurements are referred to as "dark field" measurements.

Using the following notation:-

$\delta$ = Phase difference introduced by difference in principal stresses (Radians) Condition for extinction is $\delta = 2n\pi$ (relative retardation = whole number of wavelengths)

i = Light Intensity (Grey scale, 0–256, as digitised by camera)

C = Stress-Optical Coefficient (m 2.fringe/kN)

t = Objection thickness (m)

$\lambda$ = Incident Light Wavelength (nm)

Bi = Background Light Intensity/"Black Level" (Grey scale, 0–256) (due to offset in camera and inefficiency of polarizers)

IO = Maximum intensity of the sinusoidal varying component of the fringe pattern.

$\tau$ = Shear Stress ($=(\sigma 1 - \sigma 2)/2$) (kN/m 2)

$\sigma 1$, $\sigma 2$ = Principal Stresses

The relationship between $\delta$ and $\tau$ is:

$$\delta = 2 \cdot \pi \cdot C \cdot \frac{t}{\lambda} \cdot (\sigma 1 - \sigma 2)$$

Now, $\tau = (\sigma 1 - \sigma 2)/2$,
Therefore;

$$\delta_\tau = 4 \cdot \pi \cdot C \cdot t \cdot \frac{\tau}{\lambda}$$

Let $d\tau = \delta\tau 2$,
Then,
$d\tau = 4 \cdot \pi \cdot C \cdot t \cdot \tau$ The intensity idf of light of the dark field isochromatic fringes as a function of shear stress $\tau$ is given by $$idF_\tau = IO \cdot \left[ \sin\left[ \frac{d_\tau}{2 \cdot \lambda} \right] \right]^2 + Bi$$

and the intensity ibf of the bright field fringes as a function of shear stress $\tau$ is given by $$ibf_\tau = IO \cdot \left[ \cos\left[ \frac{d_\tau}{2 \cdot \lambda 0} \right] \right]^2 + Bi$$

Taking the difference between, and sum of, bright field intensity and dark field intensity, using the identity; $\cos^2 \Theta - \sin^2 \Theta = \cos 2\Theta$ for any angle $\Theta$, and letting
Diff=ibf−idf
Sum=ibf+idf
The phase $\delta$ can be calculated from the intensities using the equation $$\delta_\tau = a\cos\left[ \frac{Diff_\tau}{Sum_\tau - 2 \cdot Bi} \right]$$

Figure 2:
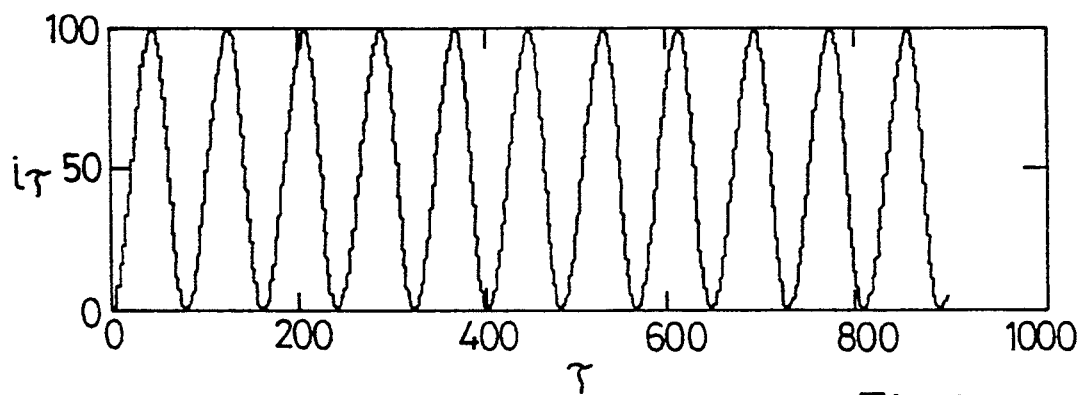
FIG. 2 is a graph showing intensity of light emitted from the object as a function of shear stress.

Using light of a first wavelength $\lambda 0$, in this case 633 nm, an isochromatic fringe map showing the intensities of light at each pixel of the CCD camera for the dark field arrangement of the polaroids is produced, using a process called max/min scanning described below. This method eliminates isoclinic fringes from the map. The isochromatic fringe maps are stored in the memory. The intensity i as a function of stress $\tau$ is as shown in FIG. 2.

Figure 3:
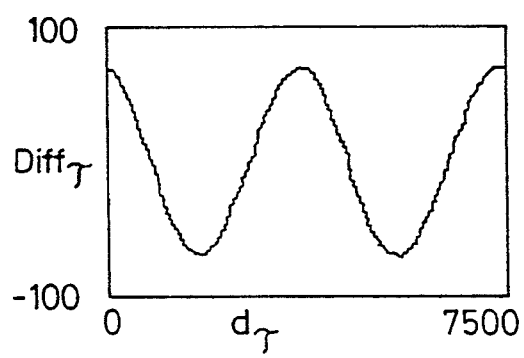
FIG. 3 is a graph showing intensity difference maps for dark and bright field measurements for each of two wavelengths.
Figure 4:
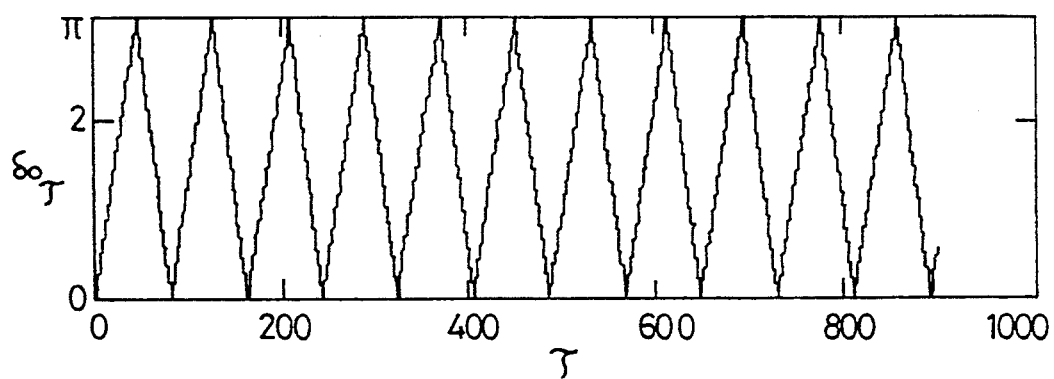
FIG. 4 is a graph showing fringe phase as a function of shear stress.

The light field intensity is then measured and recorded as an isochromatic fringe map for the first wavelength $\lambda 0$. The sum of the bright and dark field intensities and the difference between them are then calculated for each pixel. FIG. 3 shows the difference in intensities as a function of the parameter d for wavelength $\lambda 0$. The phase $\delta$ is then calculated for each pixel and the phase information is stored in the memory as a phase map. FIG. 4 shows the phase as a function of d for $\lambda 0$. This process is then repeated for a second wavelength $\lambda 1$, in this case 589 nm, and corresponding fringe maps and a phase maps are stored in the memory.

The next step is to use the phase maps to determined the magnitude of shear stress in the object.

Since any calculated value of the phase $\delta$ could correspond to several different values of stress magnitude in the object, the phase maps for the two wavelengths $\lambda 0$ and $\lambda 1$ have to be combined to determine the absolute stress magnitude $\tau$. This can be done in various ways.

Figure 5:
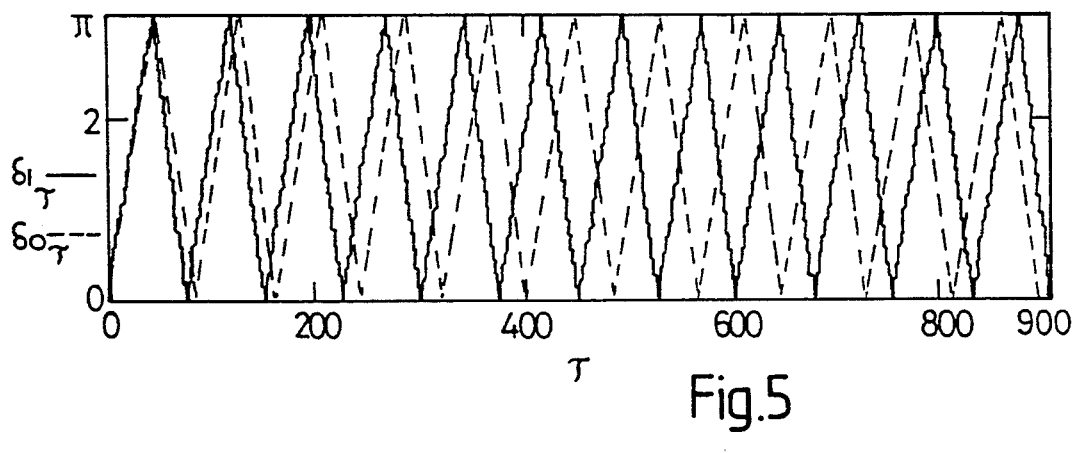
FIG. 5 is a graph showing phase as a function of shear stress for two wavelengths.

The two phase maps can be combined to form a spatial heterodyne as shown in FIG. 5. For any value of the stress $\tau$, the combination of the phases for the two wavelengths $\lambda 0$ and $\lambda 1$ is unique for "n" fringes where $$n = \frac{\lambda_0}{2(\lambda_0 - \lambda_1)}$$

Figure 6:
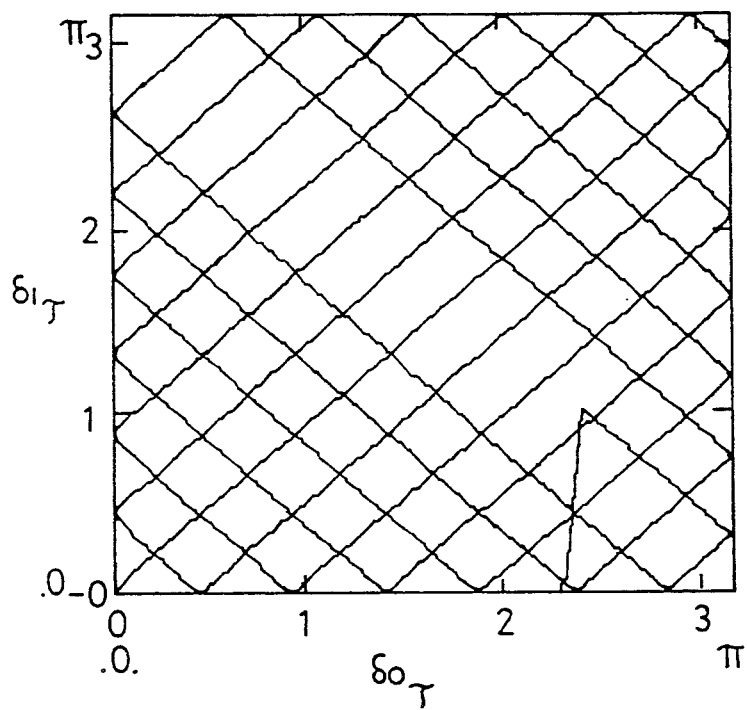
FIG. 6 represents a heterodyne look-up table.

The stress can be calculated from a look up table, such as that shown in FIG. 6, which gives directly a value of stress for any combination of phase measurements for wavelengths $\lambda 0$ and $\lambda 1$.

The stress magnitude corresponding to each of the pixels can then be stored as a stress map or displayed on the VDU.

An alternative method of calculating the absolute stress magnitude from phase maps will now be described.

Figure 7:
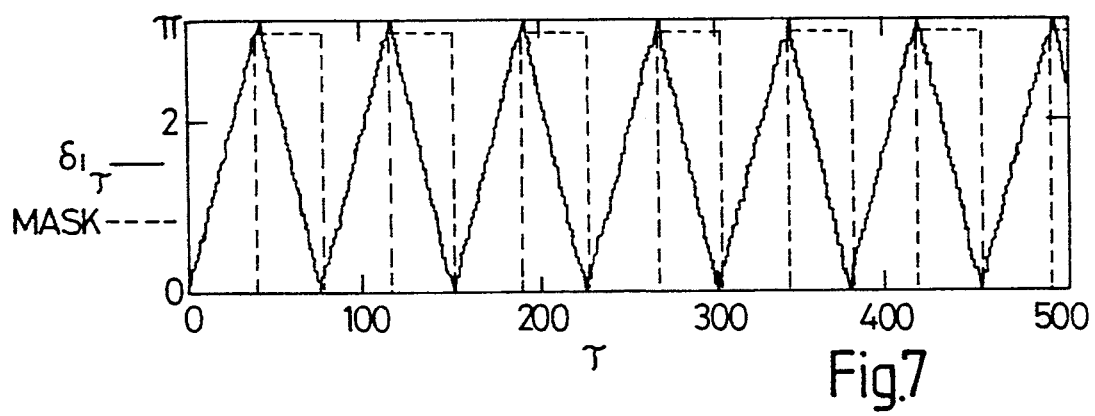
FIG. 7 is a graph showing the phase as a function of stress for one wavelength and a square wave mask, and FIG. 8 as a graph showing a ramp map formed from the map represented by FIG. 7.
Figure 8:
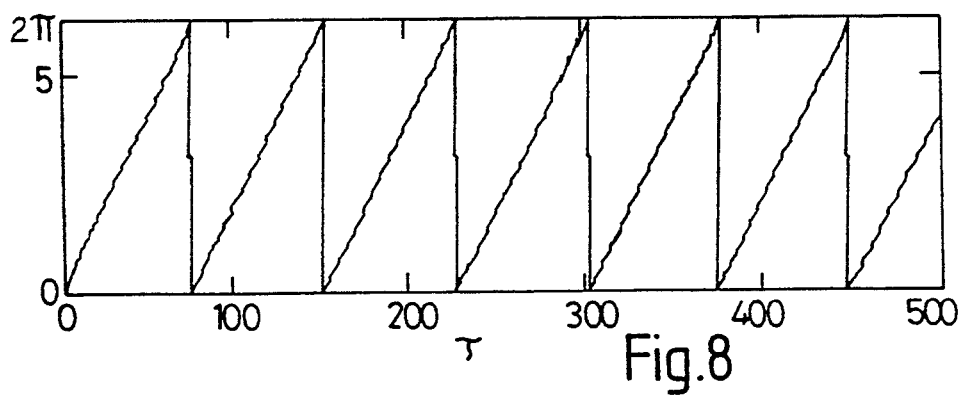

Phase maps are produced as described above, for three wavelengths of light, of wavelengths $\lambda 1$, $\lambda 2$, $\lambda 3$ which are related by the equation $$\lambda_2 = \frac{2\lambda_1 \lambda_3}{\lambda_1 + \lambda_3}$$

if $\lambda 2$ is 589 nm and $\lambda 3$ is 633 nm, $\lambda 1$ is 550 nm. The phase maps for $\lambda 1$ and $\lambda 3$ are then compared and used to produce a square wave mask which has a high value when $\lambda 1 - \lambda 3$ is positive and a low value when $\lambda 1 - \lambda 3$ is negative. This mask has a "wavelength" equal to that of the phase map of $\lambda 2$ as shown in FIG. 7. The phase map of $\lambda 2$ can then be converted to a ramp map, as shown in FIG. 8.

The ramp function has a value, which can be represented by the brightness of the pixels in a visual display, which increases at a constant rate up to a phase of $2\pi$ radians, where there is a discontinuity and the function returns to zero, from where it rises again to a phase of $2\pi$ radians, this pattern repeating with increasing values of the shear stress.

The ramp map produced can easily be converted into a stress map because the discontinuities can easily be detected. The computer, starting from an area of zero stress, can count the number of discontinuities to determine the absolute fringe order and, from that number and the value of the ramp function at the point, determine the absolute stress at a corresponding point on the object. The process of determing fringe order is referred to as unwrapping.

An alternative way of identifying the absolute fringe order is to use four wavelengths of light. The top three and bottom three are each combined to form a ramp map as described above, and the two ramp maps are then spatially heterodyned in the same way as the two colour method described above.

In order to create the bright field and dark field fringe maps of the isochromatic fringes only, it is necessary to remove the isoclinic fringes. This can be done by addition of images at two discrete positions in a plane polariscope or by using quarter wave plates. However these methods are more error prone than the method called max/min scanning as mentioned above. In this method, use is made of the fact that, if the polarizer and analyzer are rotated together, the isoclinic fringes rotate, but the isochromatic fringes do not.

In this particular example of max/min scanning, the polaroids are rotated together in steps of 5° and at each step the light intensity at each pixel on the camera is compared with the intensity value stored in the memory for that pixel. If the new intensity is higher, then it is recorded as the new value for that pixel. If the new value is lower, it is ignored. If the polaroids are are rotated through 90° in steps, the isoclinic fringes are "washed out" and the fringe map retained contains only the isochromatic fringes.

Two further refinements to this technique can be made. Firstly by rotating the polaroids through 360 degrees, four fringe maps can be produced and then averaged. Secondly the polaroids can be left in continuous rotation such that the camera records the average intensity over a five degree increment. Both of these refinements help to reduce point variations in the polariscope.

According to a second embodiment of the invention different wavelengths of light are used to determine the direction of stress in the object using the isoclinic fringes.

For this, use is made of the fact that the isoclinic fringes do not change if the wavelength of light used is changed.

The angle q between the direction of stress in the object and the axis of the polarizer is given by the equation $$q = 1/4 \tan^{-1}\left(\frac{i_{22.5(x,y)} - i_{67.5(x,y)}}{i_{45(x,y)} - i_{0(x,y)}}\right)$$

where $i_{22.5}$ is the intensity of light at a point when the polarizer and analyser are perpendicular, and the angle $\phi$ between the analyzer and the horizontal is 22.5 degrees.

The intensity of light at each pixel is therefore measured to form a fringe map for angle $\phi$ at values of 0°, 22.5°, 45° and 67.5°, and these intensities are combined to give a value of q for each pixel.

However, ambiguities in this data arise where the isochromatic fringes cross over the isoclinic fringes.

A fringe map of isochromatic and isoclinic fringes is therefore recorded for each of two wavelengths $\lambda 0$ and $\lambda 1$, for each of the four values of the angle $\phi$.

The two phase maps are then compared and the highest value of intensity for each pixel is recorded to form an isoclinic fringe map. It has been found practically that wavelengths of 589 nm and 633 nm are sufficient for most applications. This method can be further improved by using several wavelengths of light, and taking the highest value of intensity for each pixel to form the isoclinic fringe map.

It is an advantage of all the methods described above that they use plane polarized light. Other known methods use circularly polarized light for which quarter wave plates are required which are expensive and can introduce inaccuracies.

In order to determine the magnitude and direction of stress in the object, the stress magnitude maps and stress direction maps can be combined to form a full stress vector map.

We claim:

1. A method for measuring stress in an object of birefringent material the stress having magnitude and direction, the method comprising the steps of passing polarized light of first, second and third wavelengths through the object and then an analyzer to produce respective fringe patterns, for each wavelength measuring and recording intensities of light emitted from the analyzer for a plurality of positions in the respective fringe pattern and combine the recorded intensities for the first, second and third wavelengths to form a ramp map having a discontinuity at predetermined values of stress and converting the ramp map to a stress map indicating the magnitude of the stress in the object as a function of position within the object.

2. A method according to claim 1 wherein the step of forming a ramp map comprises, for each said wavelength, recording the intensities for the said positions in the fringe patterns as first, second and third fringe maps respectively, and reading information from the fringe maps to produce the ramp map.

3. A method according to claim 2 wherein the step of producing the ramp map includes processing the information from the fringe maps to form first, second and third phase maps, and combining the phase maps to form the ramp map.

4. A method according to claim 3 wherein the step of producing the ramp map includes combining the first and second phase maps to form a square wave map of a wavelength equal to a wavelength of the third phase map.

5. A method according to claim 1 wherein the step of recording the intensities for the first, second and third wavelengths includes measuring and recording the intensity of light emitting from the analyzer as a function of position in the respective fringe pattern for each of a plurality of orientations of the polarized light when it is incident on the object and the analyzer, relative to the object, and comparing the intensities for each orientation to isolate isochromatic fringes.

6. A method according to claim 1 further comprising a step of measuring the direction of the stress in the object.

7. A method according to claim 6 wherein the step of measuring the direction of the stress in the object includes comparing the intensities for at least two of said wavelengths for each of said positions in the fringe pattern to determine which intensity is higher and using the higher intensity for each said position to produce an isoclinic map.

8. Apparatus for measuring stress in an object of birefringent material comprising:

a source of polarized light of first, second and third wavelengths; an analyzer, having an analyzer direction, for transmitting a component of the light, emitting from the object, which is parallel to the analyzer direction thereby to form a fringe pattern; light detecting means for measuring intensities of light emitted from the analyzer for a plurality of positions in the fringe pattern; a memory for storing the intensities; and processing means for combining the intensities for said first second and third wavelengths to form a ramp map having a discontinuity at predetermined values of stress and converting the ramp map to a stress map indicating a magnitude of the stress in the object as a function of position within the object.

9. Apparatus according to claim 8 wherein the processing means is arranged, for the first, second and third wavelengths, to record the intensity for the said positions as first, second and third fringe maps respectively, and read the intensities from the fringe maps to produce the ramp map.

10. Apparatus according to claim 9 wherein the processing means is arranged to process the intensities for the first, second and third wavelengths to form first, second and third phase maps, and combine the phase maps to form the stress map.

11. Apparatus according to claim 10 wherein the processing means is arranged to combine the first and second phase maps to form a square wave map of a wavelength equal to that of the third phase map.

12. Apparatus according to claim 11 wherein the processing means is arranged to convert the third phase map to a ramp map having a single discontinuity for each phase of the phase map.

13. Apparatus according to claim 8 wherein the processing means is arranged during the step of recording the intensities for the first, second and third wavelengths, to measure and record the intensity of light emitting from the analyzer as a function of position in the respective fringe pattern for each of a plurality of orientations of the polarized light when it is incident on the object and the analyzer, relative to the object, and compare the intensities for each orientation to isolate isochromatic fringes.

14. Apparatus according to claim 8 wherein control means is further arranged to measure a direction of stress in the object.

15. Apparatus according to claim 14 wherein the processing means is arranged to compare the intensities for at least two of said wavelengths for each of said positions in the fringe pattern and to determine which intensity is higher to produce an isoclinic map.

* * * * *